Patented Mar. 13, 1934

1,950,452

UNITED STATES PATENT OFFICE

1,950,452

AQUEOUS DISPERSION OF RUBBER AND METHOD OF MAKING SAME

Harold L. Levin, Nutley, N. J., assignor, by mesne assignments, to The Patent and Licensing Corporation, New York, N. Y., a corporation of Massachusetts No Drawing. Application March 10, 1931, Serial No. 521,512

7 Claims. (Cl. 134—17)

This invention relates to improvements in aqueous dispersions of rubber and in method of making the same.

An object of the invention resides in production of artificial dispersions of rubber in water with the aid of non-colloidal mineral matter functioning in the capacity of what I term an attriting agent in the dispersing operation to facilitate and promote interfacial trituration during the dispersing action.

Another object of the invention resides in the use, in the operation for dispersing rubber in water, of an attriting agent which will additionally function as a compounding ingredient or weighting filler in the completed dispersion.

Another object resides in the use of an attriting agent of the character indicated, in combination with a substance for colloidalizing the attriting agent and to accomplish this end by means of material of such character and in such quantities as will serve to impart a paint-like body to the finished dispersion, and to permit of an increase in the effective volume without excessive thinning i. e., diluting without normal decrease in viscosity; and to impart qualities of stiffness to the dried films of the dispersion, as required in conjunction with certain uses thereof.

The invention will be described in an embodiment thereof for the production of an artificial dispersion of rubber particularly suitable for and adapted to use as a back coating for rugs and other textiles wherein the dispersion serves to bind or lock fibres to a foundation fabric, as for example, in accordance with Patent No. 1,774,204, granted to me August 26th, 1930. It will be appreciated, however, by those skilled in the art that dispersions made according to the invention herein described and claimed, are not restricted to use for this purpose, and may be readily adapted to a wide variety of other uses, as for example, in the production of waterproof cloths and fabrics of various types, in the manufacture of waterproof felt or similar fibrous sheets or boards, as sealing compositions and the like.

Briefly stated, and without intending to restrict the scope of the invention beyond the necessities of the prior art, the invention contemplates the use of a non-colloidal material such as whiting, diatomaceous earth, silex, slate dust, or the like in combination with a water soluble gum such as locust bean gum, gum arabic, gum tragacanth, karaya gum or the like, for effecting dispersion of rubber or rubber compounds in water.

In the practice of the invention with the aid of the substances heretofore named, dispersions of various types of rubber such as the various grades of crude rubber, reclaim rubber or of blends of such rubbers with substances such as mineral rubber, may be effected in various ways. Thus, for example, crude rubber may be converted into the form of an aqueous dispersion by plasticizing the same on a standard rubber mixing mill or equivalent apparatus, in the usual way, together with mineral rubber or other fluxing agents, in quantities varying up to 40 or 50% by weight of the crude and then dispersing the plasticized mass by subjecting the same to a kneading or masticating action by means of an ordinary kneading or masticating machine such as a Werner-Pfleiderer mixer, in a relatively stiff paste of one of the gums hereinabove mentioned together with an attriting agent such as whiting, in water. The presence of sufficient quantities of the non-colloidal powder in the paste insures the maintenance of sufficient bulk and a consistency such that the necessary interfacial trituration of the rubber may take place while the aqueous paste is maintained throughout the operation as the continuous phase of the mass undergoing the action of the mixer. The mass in the mixer is preferably maintained at a temperature of about 170 to 200° F. during the operation. The quantities of gum employed may vary from 3 to 15% by weight of the rubber or rubber compound to be dispersed and the quantity of non-colloidal powder or attriting agent may vary from 30 to 100% by weight of the rubber, and the finished dispersions produced in accordance herewith may vary in rubber content from 10 to 50% by weight of the product, which may be discharged from the mixer at the completion of the dispersing operation and put to the desired use or may be diluted therein to any desired volume with further quantities of water, varying up to 300% by weight of the completed dispersion.

Illustrating this method of carrying out the invention by a specific example, approximately 300 parts by weight of reclaim rubber may be milled with 10 to 25 parts by weight of a fluxing agent, such as rosin, in a Banbury mixer for approximately fifteen minutes to bring about a substantially plastic condition of the rubber. Other fluxing agents such as pine tar, cumar resin, or mineral rubber in appropriate quantities may be substituted for the rosin. If desired certain quantities of whiting or similar material say up to 50% of the rubber may be worked into the rubber during the step of plasticizing the same in the Banbury mixer. The milled batch of rubber may be then transferred to a masticating or kneading machine, preferably a Werner-Pfleiderer steam jacketed mixer, containing the following ingredients in approximately the proportions indicated in parts by weight;

| | |
|---|---|
| Locust bean gum | 10 to 40 |
| Whiting | 100 to 300 |
| Water to form a paste | 100 to 250 |

Steam is fed through the jacket of the mixer to maintain the contents at a temperature of approximately 180° F. and the mixer started. After all of the rubber batch has been added to the paste in the mixer, the latter is continued in operation until dispersion is complete, water being added, if required, to maintain substantially the original aqueous paste condition, in compensation for water that may be lost by evaporation or in minimization of increasing thickness due to continued subdivision of the rubber into finely divided particles. Compounding ingredients including vulcanizing agents, vulcanization accelerators etc., may be added at any stage of the operation and the batch of finished dispersion may be diluted with water to the desired volume.

In another mode of practicing the invention with the use, of the water-soluble gums contemplated herein, the rubber or rubber compound may first be worked on a rubber mixing mill until it is caused to assume a more or less plastic condition, whereupon a quantity of the gum may be worked into the rubber, with small quantities of water as desired. The mass may then be transferred to the mixing machine such as a Werner-Pfleiderer mixer, and dispersed in the presence of an aqueous paste of an attriting agent, such as whiting, so that as sub-division of the rubber proceeds, fresh quantities of the gum are continually exposed for colloidalizing the attriting agent paste maintained as the continuous phase of the system, with timely additions of water, if necessary.

The dispersions obtained in accordance with this invention are suitable for various uses known in the art and find special adaptations for purposes in which it is essential that the dispersion be highly bodied as above described and "extended" (in the sense that it may be diluted for increasing its effective volume, with substantially less than normal reduction in viscosity) and capable of forming a film, upon drying, which possesses considerable stiffness. These latter functions are secured by my invention through the use of the gums that serve primarily to colloidalize the non-colloidal attriting agent. These properties of the finished dispersion render the same especially suitable as a rug backing material, as above pointed out.

These dispersions may also be used as a bonding medium for double fabrics in the manufacture of articles such as vehicle tops, water hose etc.

They may also be employed in the manufacture of waterproof paper by incorporating the dispersion with fibrous pulp of any desired character, after which a precipitating or fixing agent such as alum may be added to the mixture of pulp and dispersion and the mass sheeted on any form of standard paper making machine for the production of sheets or boards useful for various purposes, the sheet being heated and pressed to effect coalescence of the rubber upon the fibers.

I claim as my invention:

1. In the art of making artificial dispersions of rubber in water, the improvement which resides in effecting the dispersion of the rubber in the presence of a relatively stiff aqueous paste of non-colloidal mineral powder colloidalized with a gum, while maintaining said paste as the continuous phase.

2. In the art of making artificial dispersions of rubber in water, the steps which comprise making a relatively stiff aqueous paste of a non-colloidal attriting agent and a gum, and effecting the dispersion of rubber in said paste while maintaining the same as the continuous phase.

3. In the art of making artificial dispersions of rubber in water, the improvement which resides in effecting the dispersion of the rubber in a relatively stiff aqueous paste of whiting and a gum, while maintaining said paste as the continuous phase.

4. In the art of making artificial dispersions of rubber in water, the improvement which resides in plasticizing rubber together with a substance capable of swelling in water, manipulating the plasticized rubber in an aqueous paste of a non-colloidal mineral powder to cause the said substance to swell and become exposed to colloidalize said paste and continuing the manipulation until the rubber becomes dispersed in finely divided particles.

5. In the art of making artificial dispersions of rubber in water, the improvement which resides in plasticizing rubber together with a water soluble gum, manipulating the plasticized rubber in an aqueous paste of a non-colloidal mineral powder to cause the said gum to colloidalize said paste and continuing the manipulation until the rubber becomes dispersed in finely divided particles.

6. In the art of making artificial dispersions of rubber in water, the improvement which resides in plasticizing rubber together with substantial quantities of an inert non-colloidal filler material, and effecting dispersion thereof in the presence of an aqueous paste of non-colloidal mineral powder colloidalized with a gum while maintaining said paste as the continuous phase.

7. In the art of making artificial dispersions of rubber in water, the improvement which resides in plasticizing rubber together with substantial quantities of an inert non-colloidal filler material, and effecting dispersion thereof in the presence of an aqueous paste of whiting and a gum while maintaining said paste as the continuous phase.

HAROLD L. LEVIN.